United States Patent [19]

Kalitz

[11] 4,178,036
[45] Dec. 11, 1979

[54] POSITIVE LOCK MECHANISM FOR VEHICULAR SLIDING ROOF PANELS

[75] Inventor: Milton C. Kalitz, Allen Park, Mich.

[73] Assignee: American Sunroof Corporation, Southgate, Mich.

[21] Appl. No.: 842,556

[22] Filed: Oct. 17, 1977

[51] Int. Cl.² .............................................. B60J 7/18
[52] U.S. Cl. .............................................. 296/137 B
[58] Field of Search ............ 296/137 B, 137 E, 137 F, 296/137 G, 137 H; 49/463, 36, 453

[56] References Cited

U.S. PATENT DOCUMENTS

| | | | |
|---|---|---|---|
| 2,190,462 | 2/1940 | Votypka | 296/137 G |
| 2,556,062 | 6/1951 | Buehrig | 296/137 B |

Primary Examiner—Joseph F. Peters, Jr.
Assistant Examiner—Norman L. Stack, Jr.
Attorney, Agent, or Firm—Basile and Weintraub

[57] ABSTRACT

A positive lock mechanism for a lifter assembly associated with a vehicular sliding roof panel limits the path of travel of the lifter assembly. The mechanism includes a trailing pin interconnected to the lifter assembly for co-extensive travel therewith. A slotted guide plate is engaged by the trailing pin to limit the travel of the lifter assembly.

19 Claims, 8 Drawing Figures

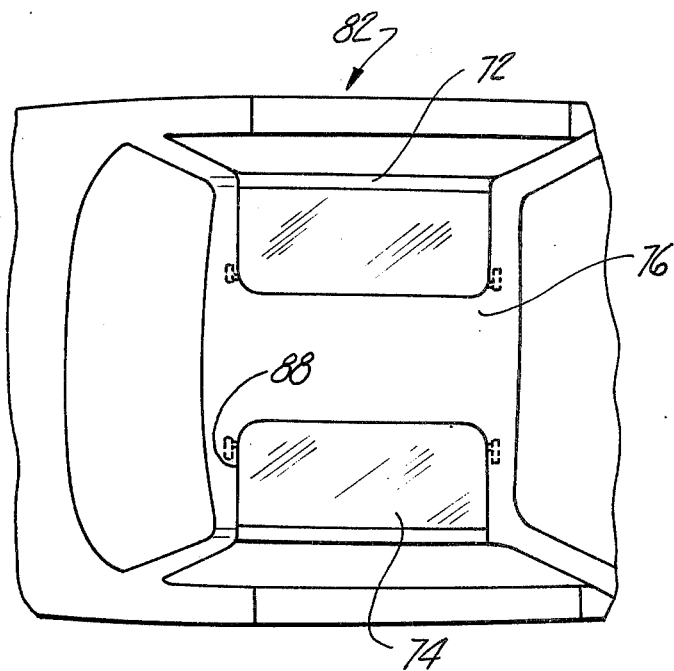
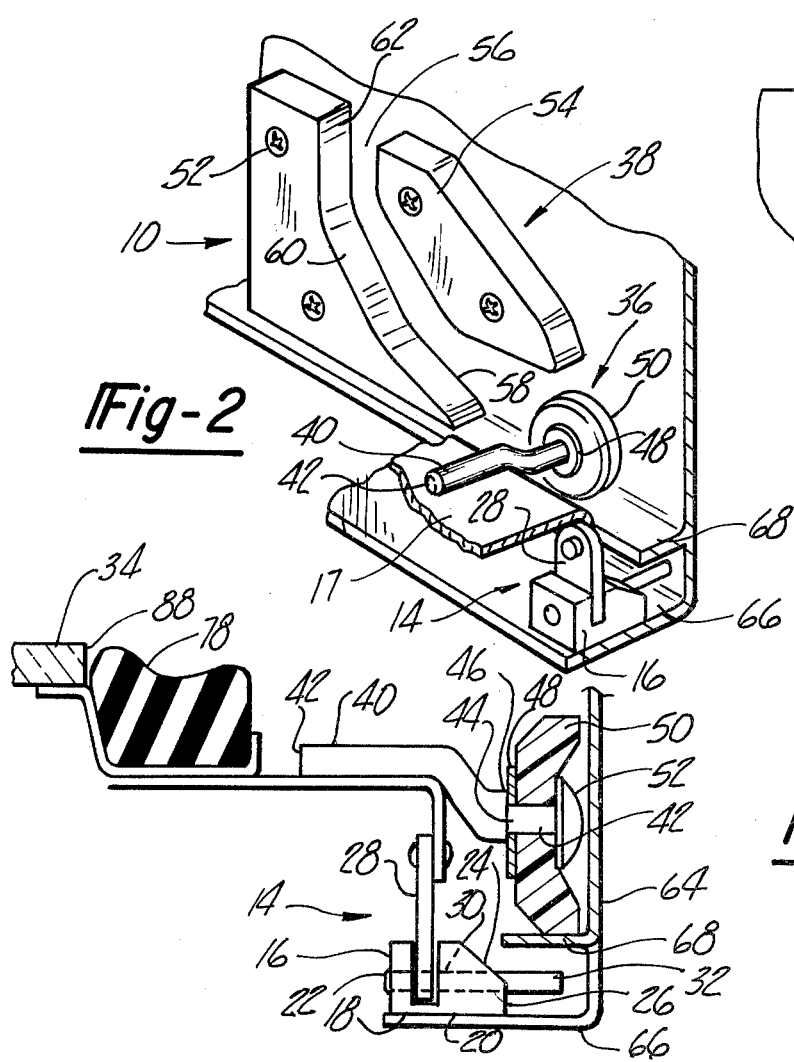
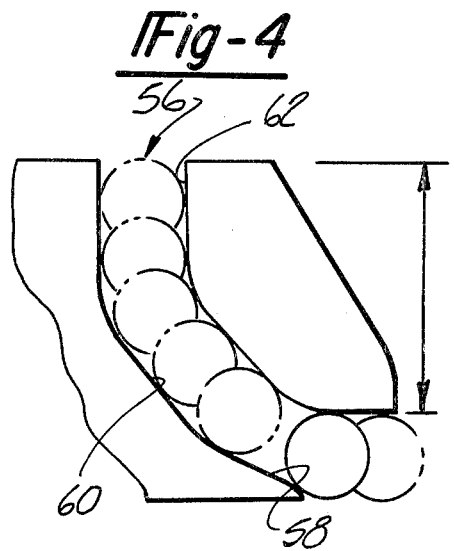

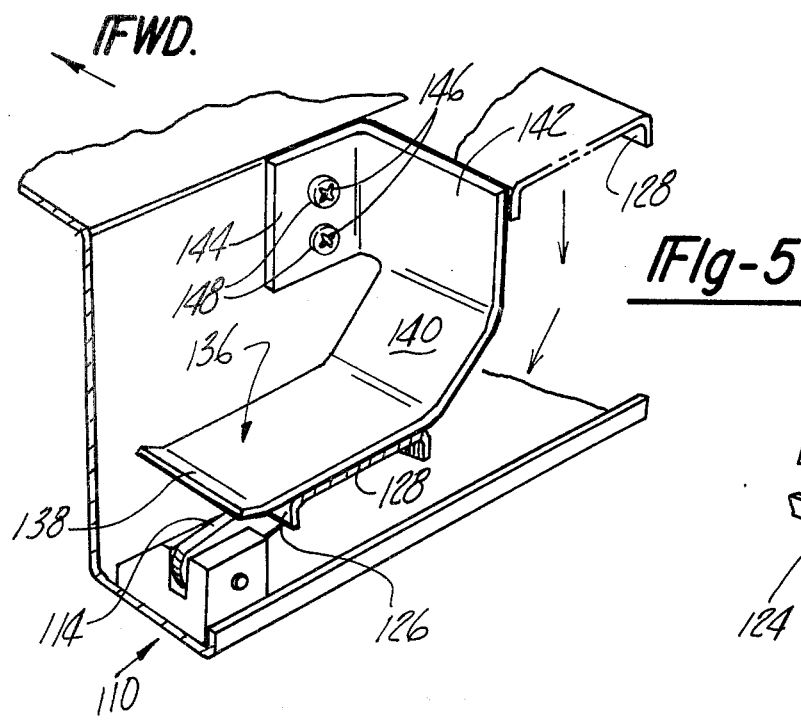
Fig-5
Fig-6
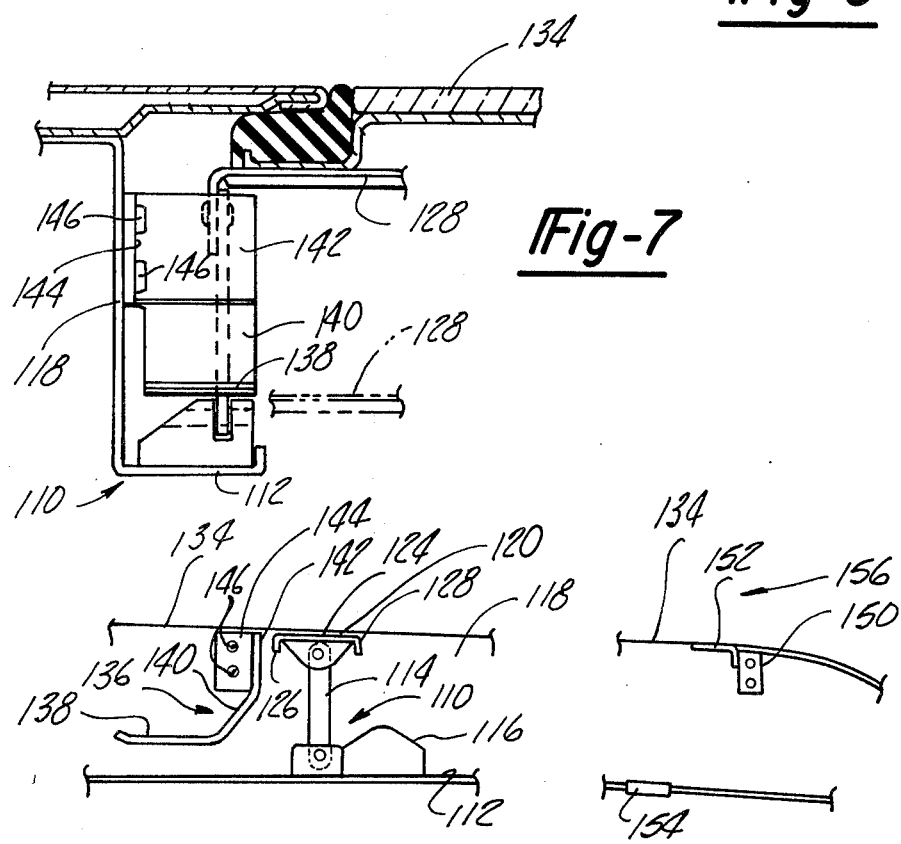
Fig-7
Fig-8

POSITIVE LOCK MECHANISM FOR VEHICULAR SLIDING ROOF PANELS

BACKGROUND OF THE INVENTION

1. Field of the Invention

The present invention pertains to sliding roof panels for vehicles. More particularly, the present invention pertains to lifter mechanisms for vehicular sliding roof panels. Even more particularly, the present invention pertains to positive lock mechanisms for the lifter mechanisms of vehicular sliding roof panels.

2. Prior Art

The present day automotive market has seen a phenomenal proliferation in the development and deployment of movable roof panels. Such panels fall into three classes which are: (a) manually operated, (b) manually removable or (c) power-operated panels. Manually operated and/or removable panels have certain characteristics and requirements which are indigenous thereto. Of course, the same is true with respect to the power-operated panels.

Power-operated panels must meet certain rigid criteria. Among the foremost criteria is that the panel maintain its closed or roof-contiguous mode when so disposed. It is conceivable, and it has been observed, that sufficient vibratory motion and forces can be applied to the vehicle to cause the panel assembly to slide in its track away from the closed mode. This is a condition which should be and must be steadfastly avoided.

It should be noted, however, that such an occurrence is rare with conventional sun roof and moon roof installations. By "conventional" sun roof and moon roof installations is meant the type of installation which moves from the front to the rear of the vehicle. This type of installation is described, inter alia, in U.S. Pat. No. 3,964,784.

The problem of movement is occasioned, however, with the inboard and outboard movement of powered "hatch" roof panels. Powered hatch roof panels have been described in U.S. Pat. No. 3,036,860 as well as in copending U.S. patent application Ser. No. 826,370, filed Aug. 22, 1977, and entitled "Electrically Operated Hatch Roofs".

It has been found that as the door of the vehicle encounters the hatch roof assembly upon door closure, that the impact tends to slide the panel inboard, i.e. out of closed and sealed position. It is to be appreciated that prevention of the movement of the hatch roof panel upon door closing is highly desirable as well as necessary to provide a marketable product. It will be appreciated from the ensuing description that the present invention provides the necessary positive lock mechanism.

STATEMENT OF RELEVANT PRIOR ART

To the best of applicant's knowledge the art is devoid of any positive lock mechanisms for sliding roof panel lifter mechanisms.

SUMMARY OF THE INVENTION

In accordance with the present invention there is provided a positive lock mechanism for a sliding roof panel. The lock mechanism hereof comprises in a first embodiment a trailing pin interconnected to a sliding roof panel lifter mechanism. The trailing pin is rigidly interconnected to the lifter mechanism for simultaneous and co-extensive travel therewith.

A slotted plate traverses the path of travel of the trailing pin. As the pin encounters the plate during its travel, the pin travels within the slot to limit the movement of the pin. Because the pin is fixedly connected to the lifter mechanism, its path of travel is likewise limited. Furthermore, by virtue of the configuration of the slot formed in the plate, any ordinary forces applied to the sliding roof panel, such as by door closing, the pin remains in its positive lock mode. Thus, the panel, per se, remains in the sealed and closed mode.

In an alternate embodiment hereof, the positive lock mechanism includes a guide plate in contact with a bracket which supports the roof panel and which is secured to the lifter mechanism. The guide plate directs the travel of the bracket and, thus, the roof panel.

The present invention, also, comprises a lifter mechanism in combination with the positive lock mechanism hereof, as well as the sliding roof panel constructed therefrom.

The present invention enjoys particular utility in associated with power-operated hatch roof panels.

For a more complete understanding of the present invention reference is made to the following detailed description and accompanying drawing. In the drawing like reference characters refer to like parts throughout the several views in which:

BRIEF DESCRIPTION OF THE DRAWING

FIG. 1 is a top plan view of a vehicle having hatch roofs incorporating the present invention;

FIG. 2 is a broken, perspective view of a first embodiment of the present invention;

FIG. 3 is a cross-sectional view taken along line 3—3 of FIG. 2;

FIG. 4 is a front elevational view of the plate member used in the first embodiment hereof and depicting the path of travel of the tailing pin;

FIG. 5 is a perspective view of an alternate embodiment hereof;

FIG. 6 is a broken, perspective view of the bracket used in the alternate embodiment;

FIG. 7 is a broken, side elevational view of the alternate embodiment hereof;

FIG. 8 is a schematic diagram of the embodiment of FIG. 5 with a hatch panel in closed or sealing position.

DESCRIPTION OF THE PREFERRED EMBODIMENT

At the outset, it should be noted that the present invention is applicable to sliding roof panels, in general. Thus, the present invention is applicable to opaque, such as metallic sliding roof panels which are commonly referred to as "sun roofs" as well as glass or translucent sliding roof panels which are commonly referred to as "moon roofs". Generally, these panels move into and out of openings formed in the roof of the vehicle. The panels move from the front to the rear of the vehicle. As heretofore noted, the present invention enjoys particular utility with respect to powered hatch roof panels. Such panels, which can be opaque or translucent, move inboard and outboard of a central roof pillar. Such panels are designed to be contiguous with the roof and door of the vehicle when in the outboard position. As heretofore noted, power operated hatch roof panels are more particularly described in U.S. Pat. No. 3,036,860 and the above-referred to copending patent application. The present invention is equally applicable to all such roof panels.

Furthermore, and as is known to the skilled artisan, the roof panels are moved by a "lifter" mechanism or assembly. Generally, the lifter mechanism is slidably movable in a track and has the roof panel connected thereto. Thus, as the lifter moves or slides in its track it causes a co-equal movement of the panel connected thereto. The lifter is ordinarily powered by an electrically powered cable or the like. Such lifter assemblies, per se, are documented in the art. See, inter alia, U.S. Pat. Nos. 3,055,701 and 3,033,609.

In practicing the present invention, the positive lock mechanism is advantageously deployed in combination with a lifter mechanism of the type described in U.S. Pat. No. 3,055,701, the disclosure of which is hereby incorporated by reference. This type of lifter mechanism, generally, comprises a sliding plate having a movable cable connected thereto. The plate is disposed within a track for sliding movement therewithin. As the cable moves by virtue of a motive force applied thereto, this causes an equal and contemporaneous movement of the sliding plate. Pivotally connected to the sliding plate is a toggle or link. The link carries a bracket which, in turn, is connected to the roof panel. Thus, movement of the plate causes movement of the link and, thus, the roof panel. Ordinarily, an obstruction, such as a camming surface is disposed in the track. As the link travels in the track it encounters the camming surface. This urges and moves the link from a horizontal position in the track to a substantially vertical position in contact with the camming surface. It is this camming or toggling of the link or toggle which urges the roof panel into sealing or closed position. Again, it is to be perceived that disengagement of the link from the camming surface causes the roof panel to move out of its closed mode. The present invention precludes the disengaging movement of the link away from the camming surface or stop.

Now, and with reference to the drawing, there is depicted therein a positive lock mechanism in accordance with the present invention and, generally, denoted at 10. The positive lock mechanism, as noted, is deployed in conjunction with a lifter assembly 14, such as described in U.S. Pat. No. 3,055,701. The lifter mechanism, per se, generally, comprises a triangulated bracket 16. The bracket 16 comprises a base 18 having a lateral or side recess 20. The periphery of the recess is defined by a pair of opposite flanges 22, 24. Each flange is provided with an aperture 26 (only one of which is shown). The flange apertures are in registry. The width of the recess is dimensioned to accommodate a link or toggle 28 therewithin as shown. The base of the toggle 28 is provided with an aperture 30 which registers with the flange apertures. A pivot pin 32 extends through the registering apertures to thereby pivotally mount the toggle or link to the bracket 16.

The link has a bracket 17 connected thereto which is, in turn, connected or otherwise secured to the roof panel 34. Thus, as the bracket 16 moves so does the link and the roof panel connected thereto via the link bracket 17. This mode of operation is defined in the above referred to patents, U.S. Pat. Nos. 3,055,701 and 3,033,609, inter alia.

Referring again to the drawing, and in particular FIGS. 1-4, integrated with the movement of the lifter assembly 12 is the positive lock mechanism 10 hereof. The positive lock mechanism hereof, generally, comprises (a) a trailing or following pin 36 interconnected to the bracket 17 and (b) a slotted plate 38 which follows the path of travel of the pin 36.

With more particularity, and in a first embodiment hereof, the trailing pin 36 comprises a rod 40 having one end 42 affixed to the bracket 17 of the lifter assembly. The rod 40 is affixed to the bracket by any suitable mode, such as welding, threaded fasteners and the like. The opposite or free end of the rod comprises an elongated reduced diameter section 42 which define a shaft 44. The junction between the rod 40 and its reduced diameter section 42 defines an annular stop or shoulder 46. A washer or bearing surface 48 is journalled into the shaft 44 with the shoulder defining a stop therefor, as shown.

A roller 50 is mounted onto the shaft 44 and bears against the washer 48. The roller is a toroidal member having a central opening or bore which permits mounting of the roller onto the shaft. A cap or rivet 52 is fixed onto the end of the shaft 44. The cap sandwiches the roller between itself and the washer 48. The action of the roller cooperates with the plate 38 to define the positive lock hereof.

The slotted plate 38 comprises a pair of spaced apart, first and second members 52, 54, respectively. The space 56 between the members defines a slot and guideway for the roller. The slot comprises an entrance section 58, a guide path section 60 and a locking path 62. The width of the space 56 is constant and accommodates the roller therewithin. As shown in FIGS. 3 and 4 the opposing interior surfaces of the members are analogously configured and cooperate to define the various sections above-denoted.

The plate members 52, 54 are mounted onto a wall 64. The wall 64 comprises a portion of a housing or frame in which the sliding roof panel is mounted. A track 66 is formed at the base of the wall 64. The lifter assembly or mechanism slides in the track 66. A ledge 68 is formed above the track 66. The ledge projects outwardly from the wall 66 and is substantially perpendicular thereto. The ledge 66 defines a track for the roller 50. The plate members are secured to the wall 64. The first member 52 has its base seating on the ledge, as shown. Threaded fasteners 70 or the like secure the plate members to the wall.

It will be perceived that as the lifter mechanism travels towards a closed or sealing mode, this causes an initial contemporaneous linear motion in the roller 50 along the track 66. After a predetermined amount of travel the roller encounters the entrance section of the plate member. As the lifter continues to travel so does the roller, but into the path defined by the slot or space 56, as opposed to a linear motion. This travel path is imparted to the bracket 17 as well as being defined and enhanced by the link or toggle motion and, thus, the roof panel. Therefore, as the roller travels on the inclined path of the guide section, the roof panel is partially lifted. As the roller travels upwardly or vertically in the locking path the roof panel, likewise lifts up.

As heretofore noted, the present invention is particularly suited for deployment with a powered hatch roof assembly. Herein, opposed sliding panels 72, 74 travel between an inboard and outboard or closed position which is contiguous with the roof 76 of the vehicle. Closure comprises a seal 78 between the edge 88 of the panel 72 or 74 and the perimeter of the roof 76 about the openings in which the panels are mounted, in the known manner. It is to be perceived that by virtue of the vertical path positioning of the roller, which is fixed to the link bracket 17, it is virtually impossible to dislodge the panel 72 or 74 from its closed or sealing position by the application of a force from a horizontal plane, such as occurs upon the closing of a door (arrow 82). Hence, the panel 72 or 74 remains fixed until the lifter mechanism is actuated to retract the panels. Retraction of the panels causes a reverse toggling and dropping of the bracket and withdrawal of the roller from the slot.

It will be appreciated by the skilled artisan that the first two slot sections, also, cooperate with the lifter assembly to first define an anti-lift means to prevent premature panel raising. This is because of the engagement between the roller and the interior surfaces of the plate members. This engagement precludes and acts against any pre-mature toggling of the link and the concomitant premature lifting of the panel. The guide section cooperates with the toggle to guide the toggle motion and lifting of the panel.

Referring, now, to FIGS. 5-8, there is depicted therein an alternate embodiment of the present invention. In accordance with this embodiment the function of the trailing pin 36 is carried out by the link bracket. Furthermore, the path of travel defined by the separate plate members is determined by a guide plate which is contacted by the bracket.

As defined by this embodiment of the invention, a lifter mechanism 110 travels in a track 112. Pivotally connected to the lifter mechanism 110 is a toggle 114. The toggle travels in the track 112 until it encounters a stop or camming surface 116. Encountering the camming surface causes the toggle to pivot upwardly or vertically from its horizontal position in the track. Such movement, of course, is known to the skilled artisan and is defined in the heretofore referenced patents. The track 112 is formed integrally with and at the base of a wall 118 which comprises a portion of the frame assembly used to mount the sliding roof panel.

As hereinbefore alluded to, secured to the toggle 114 is a link bracket 120. The bracket 120 is pivotally secured to the toggle 114 via pivot pin 122 or the like. Optionally, the pivot pin 122 is defined by a threaded fastener and bolt assembly which renders the bracket adjustably mounted to the toggle 114 by virtue of the slot formed in the toggle.

The bracket 120 comprises an inverted U-shaped member having a top bight surface 124 and depending, lateral opposite, parallel side walls 126, 128, respectively. An end flange 130 integral with the bight surface 124 downwardly depends therefrom. The flange has an opening 132 formed therethrough which receives the pivot pin therethrough. Secured to the bight surface 124 is the roof panel 134.

The bracket 120 cooperates with a guide plate, generally, denoted at 136 to define the positive lock mechanism. The guide plate 136 comprises an angulated structure including a first linear leg 138, a second leg or ramp 140 inclined with respect to the first leg and a third leg 142 upwardly directed from the second leg, 140. The structure is formed as a unitary member. The third leg 142 is substantially perpendicular to the first leg. The plate 136 has its legs formed with a width sufficient to be in contact with a substantial area of the bight surface upon engagement therebetween, in a manner to be described subsequently.

As shown in FIG. 5 a mounting plate 144 is integrally formed with the leg 142 and is substantially perpendicular thereto. Mounting means, such as threaded fasteners 146 extend through suitable apertures 148 formed in the plate 144 to fixedly mount the guide plate to the wall 118. The guide plate 136, as noted, is mounted above the track 112. The guide plate is provided with sufficient structural integrity to provide a counterforce to any urgings thereagainst by the bracket 120.

In practicing this embodiment of the invention, the bight surface 124 is adapted to be in contact with the exterior surfaces of the legs of the guide plate. Thus, as the lifter assembly is driven in the track the bight surface 124 is in contact, first, with the undersurface of leg 138. Then, as the link toggles, wall 126 is in contact with inclined leg 140 and then upstanding leg 142. Thus, the path of travel of the bracket is the same as that of the roller (FIG. 4), and is shown in phantom in FIG. 5. The motive force for the lifter mechanism is to be assumed. It is to be perceived, therefore, that leg 138 defines an anti-premature lift surface; leg 140 a guide path and leg 142 a lock path in the manner heretofore described.

In practicing the present invention with a powered hatch roof panel assembly, the lifter mechanism travels outboard to close the roof opening with the panel. Preferably, the outboard end of the wall carries a stop 150 which is engaged by an outboard bracket 152 which has the panel 134 secured thereto. The bracket 152 is supported by a guide shoe 154 in the track 112. This outboard end assembly assures proper sealing with both the roof line and the door line.

As clearly shown in FIG. 8 when the panel 134 is in the closed position or outboard position, the bracket 120 is at the top of its path of travel wherein side wall 126 abuts against leg 142. A translatory force applied to the panel in the direction of arrow 156, such as is occasioned by door closure, fails to dislodge the roof panel from its sealing position since the applied forces only force wall 126 into leg 142. Hence, the roof panel is positively locked against inboard movement by the application of a horizontal force.

In practicing the present invention the roller, the slotted plate members as well as the guide plate can be formed from any suitable material, such as nylon or the like.

It is to be appreciated from the preceding that there has been described herein a positive lock mechanism for a sliding roof panel which obviates the problem of disengagement of the panel from the closed or sealing mode upon a horizontal force being applied thereto in a direction contrary to the sealing direction.

Having, thus, described the invention what is claimed is:

1. A locking action device for preventing movement of an automotive sliding roof panel, comprising:
   (a) means for following the path of travel of the panel and connected thereto,
   (b) a guiding surface interposed the path of travel of the following means, the following means engaging the guiding surface, the guiding surface defining the path of travel of the following means upon engagement therewith, and
   wherein the following means is retained in position by the guiding surface to prevent dislodgment of the roof panel when the panel is positioned to close an opening in the roof.

2. The locking action device of claim 1 wherein the following means comprises:
   (a) an elongated pin having one end connected to a support for the panel, and
   (b) a roller journalled on the other end of the pin.

3. The locking action device of claim 2 wherein the guiding surface comprises:
   a slotted plate, the plate comprising first and second members, the first and second members being spaced apart a pre-determined distance, the distance being equal to the diameter of the roller, the space between the members defining the guiding surface.

4. The locking action device of claim 1 wherein the guiding surface comprises:
   a slotted plate, the plate comprising first and second members, the first and second members being spaced apart a pre-determined distance, the distance being a function of a dimension of the following means to enable the following means to travel within the space, the opposed surfaces of the members defining a guiding track within which the following means are confined when engaged therewith.

5. The locking action device of claim 1 which further comprises:
   (a) means for sliding the panel between a first roof opening and a second roof closing position,
   (b) means for supporting the panel connected to the means for sliding, and
   wherein the means for supporting defines the means for following.

6. The locking action device of claim 5 wherein the guiding surface comprises:
   a unitary member having a pre-determined configuration which defines the path of travel of the means for following, the support means being in contact with the unitary member as the panel slides between the first and second position.

7. In a lifter assembly for a vehicle sliding roof panel of the type comprising a support member which slides in a track formed in a housing disposed in an opening formed in the roof and a pivotal link pivotally connected to the sliding support member, and a panel support bracket connected to the link, the improvement which comprises
   a locking action device for preventing movement of the panel, comprising:
   (a) means for following the path of travel of the panel and connected thereto,
   (b) a guiding surface interposed the path of travel of the following means, the following means engaging the guiding surface the guiding surface defining the path of travel of the following means upon engagement therewith, and
   wherein the following means is retained in position by the guiding surface to prevent dislodgment of the roof panel when the panel is positioned to close an opening in the roof.

8. The improvement of claim 7 wherein the following means comprises:
   (a) an elongated pin having one end secured to the panel support bracket, the other end extending therebeyond,
   (b) a roller journalled on the other end of the pin, and
   wherein the guide surface is mounted to the housing above the track.

9. The improvement of claim 8 wherein the guiding surface comprises:
   a slotted plate, the plate comprising first and second members, the first and second members being spaced apart a pre-determined distance, the distance being equal to the diameter of the roller, the space between the members defining the guiding surface.

10. The improvement of claim 7 wherein the guiding surface comprises:
    a slotted plate, the plate comprising first and second members, the first and second members being spaced apart a pre-determined distance, the distance being a function of a dimension of the following means to enable the following means to travel within the space, the opposed surfaces of the members defining the guiding surface.

11. The improvement of claim 7 wherein:
    the panel support bracket comprises the means for following.

12. The improvement of claim 11 wherein the guiding surface comprises:
    a unitary member having a configuration substantially the same as to the path of travel of the panel, the panel support bracket being in contact with the unitary member as the panel slides between the first and second position, the bracket being contiguous with the member to prevent movement of the bracket upon the application of a horizontal force to the panel, when in the second position.

13. In an automotive sliding roof panel assembly of the type adapted to slide in a track disposed in an opening formed in the roof of the vehicle, the assembly comprising a roof panel, a slider mechanism slidable in the track, and a support bracket interconnecting the roof panel to the slider mechanism, the panel being movable between a first position exposing the roof opening and a second position closing the roof opening, the improvement which comprises:
    means for preventing movement of the panel when in the second position upon the application of a horizontal force thereto, the means for preventing comprising a locking action device which comprises:
    (a) means for following the path of travel of the panel and connected thereto,
    (b) a guiding surface interposed the path of travel of the following means, the following means engaging the guiding surface, the guiding surface defining the path of travel of the following means upon engagement therewith, and
    wherein the following means is retained in position by the guiding surface to prevent dislodgement of the roof panel when in the second position.

14. The improvement of claim 13 wherein the following means comprises:
    (a) an elongated pin having one end secured to the panel support bracket, the other end extending therebeyond,
    (b) a roller journalled on the other end of the pin, and
    wherein the guiding surface is mounted in the opening above the track.

15. The improvement of claim 14 wherein the guiding surface comprises:
    a slotted plate, the plate comprising first and second members, the first and second members being spaced apart a pre-determined distance, the distance being equal to the diameter of the roller, the space between the members defining the guiding surface.

16. The improvement of claim 13 wherein the guiding surface comprises:
    a slotted plate, the plate comprising first and second members, the first and second members being spaced apart a pre-determined distance, the distance being a function of a dimension of the following means to enable the following means to travel within the space, the opposed surfaces of the members defining the guiding surface.

17. The improvement of claim 13 wherein:
the panel support bracket comprises the means for following.

18. The improvement of claim 17 wherein the guiding surface comprises:
a unitary member having a configuration substantially the same as to the path of travel of the panel, the panel support bracket being in contact with the unitary member as the panel slides between the first and second position, the bracket being contiguous with the member to prevent movement of the bracket upon the application of a horizontal force to the panel, when in the second position.

19. The improvement of claim 13 wherein:
the sliding roof panel is a hatch roof panel which moves between an inboard first position beneath a central roof pillar and an outboard second position contiguous with the roof line and the door of the vehicle.

* * * * *